United States Patent [19]
Reid

[11] 3,923,663
[45] Dec. 2, 1975

[54] FLUID PURIFICATION DEVICE

[76] Inventor: William P. Reid, 3200 E. 29th St., Long Beach, Calif. 90806

[22] Filed: July 22, 1974

[21] Appl. No.: 490,238

[52] U.S. Cl. .................... 210/251; 21/102; 210/443
[51] Int. Cl.² .......................................... B01D 35/06
[58] Field of Search .......... 210/443, 222, 223, 243, 210/169, 251; 250/435, 436, 437, 438; 21/54 R, 102 R, DIG. 2

[56] References Cited
UNITED STATES PATENTS

| | | | |
|---|---|---|---|
| 2,501,290 | 3/1950 | Pequignot | 250/437 X |
| 2,648,774 | 8/1953 | Whitlock | 250/435 |
| 3,413,465 | 11/1968 | Harrison et al. | 250/437 X |
| 3,511,776 | 5/1970 | Avampato | 210/222 |
| 3,551,091 | 12/1970 | Veloz | 250/436 X |
| 3,602,712 | 8/1971 | Mann | 250/437 |
| 3,680,705 | 8/1972 | Happer et al. | 210/222 |
| 3,683,177 | 8/1972 | Veloz | 250/435 |

*Primary Examiner*—Theodore A. Granger
*Attorney, Agent, or Firm*—Paul A. Weilein

[57] ABSTRACT

A unitary device for purifying water and other fluids embodying an annular filter surrounding an elongate tube which in turn surrounds and cooperates with an elongate ultraviolet lamp to form a flow channel for fluid to be irradiated. Fluid passing through the filter is conveyed through the flow channel along the length of the lamp to effect sterilization. The lamp is encased in a film of fluorinated ethylene propylene to prevent buildup of scale and other contamination on the surface of the lamp which would otherwise reduce transmission of ultraviolet rays to the fluid. The lamp assembly is constructed as a replaceable unit which is adapted to be mounted in reversed endwise position to accommodate the device for different types of installations.

13 Claims, 4 Drawing Figures

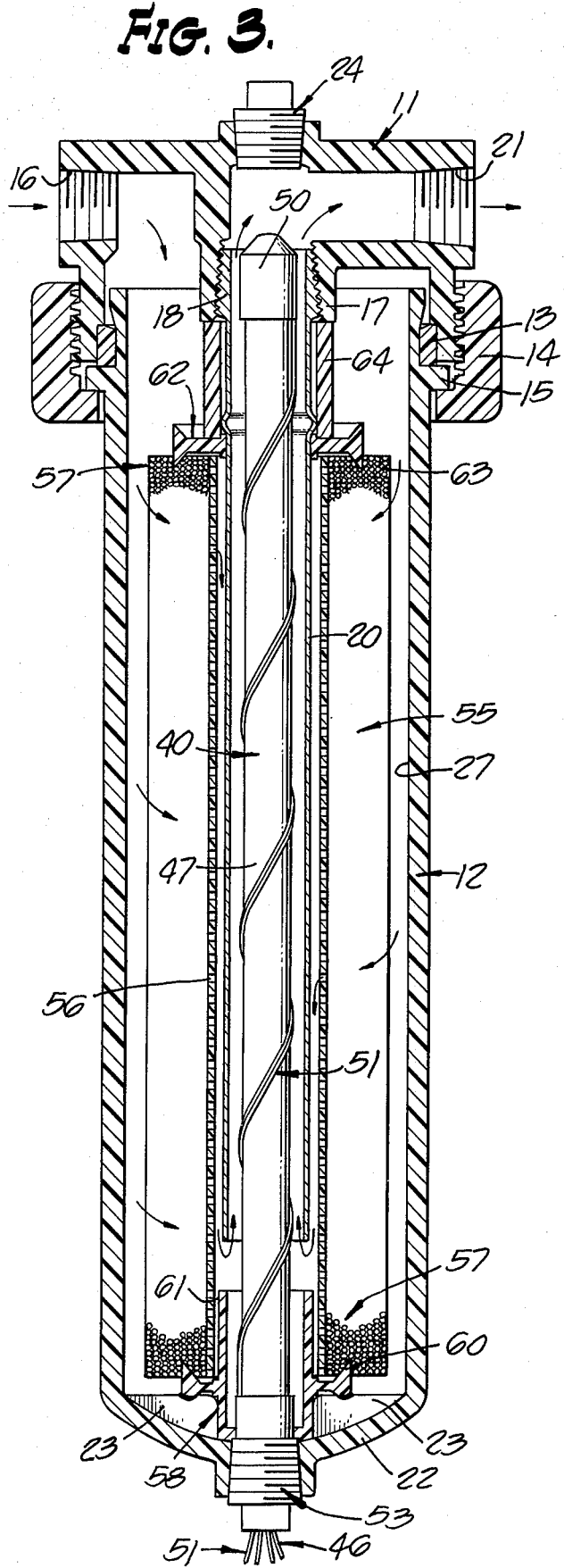
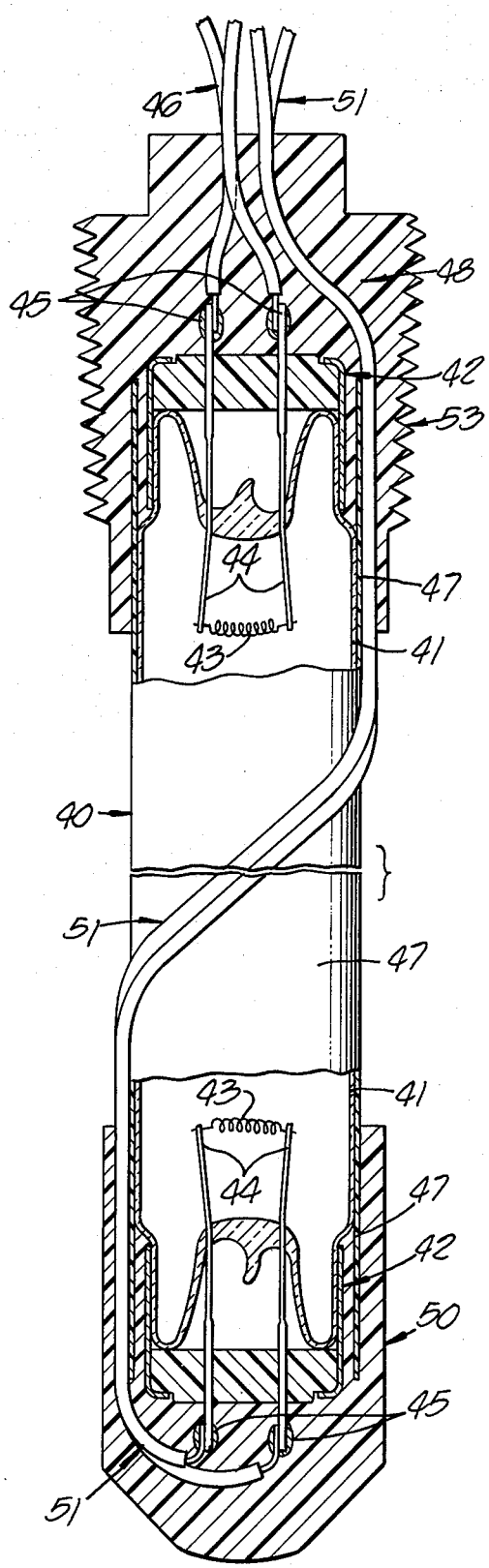

FLUID PURIFICATION DEVICE

BACKGROUND OF THE INVENTION

1. Field of the Invention

This invention relates broadly to devices for purifying water and other fluids and has particular reference to such devices wherein the components for filtering and sterilizing the fluid are contained in a single housing.

2. Description of the Prior Art

Purifying devices for water and other fluid have been known heretofore in which the fluid passes first through a filter to filter out any solids and then passes a source of ultraviolet rays effective to destroy microorganisms, spores and the like which pass through the filter. Generally, this is accomplished by passing the fluid over the envelope of an ultraviolet lamp or over a quartz jacket surrounding the lamp.

It is found that in such known devices, during operation of the lamp, calcium and other colloidal matter which passes through the filter tends to coat the lamp envelope or other transparent medium separating the fluid from the lamp, thus building up a scale or other contamination which reduces the intensity of the ultraviolet rays and therefore reduces the effectiveness of the lamp in destroying the microorganisms, etc. This attenuation of the ultraviolet transmission is not easily detected by inspection and therefore the device must be frequently disassembled and the ultraviolet lamp or quartz jacket cleaned to insure effective sterilization.

In some of the known devices, attempts have been made to maintain the efficiency by employing mechanical scrubbers or scrapers to periodically remove the accumulated scale and other contamination, but these add to the complexity and cost of the device and have not proved entirely satisfactory.

Until rather recently, these prior fluid purification devices have in general comprised separate units for first filtering and then sterilizing the fluids. Such units are relatively bulky, complicated and difficult to disassemble for cleaning, inspection and replacement of the ultraviolet lamps, filters and other components.

As will be observed from U.S. Pat. No. 3,551,091, the patentee, L. P. Veloz, attempted to overcome the disadvantages attending the use of separate filtering and sterilizing units by providing a combination water filter and sterilizer within a single housing, and wherein a removable filter surrounds an ultraviolet lamp which is shielded against the fluid pressure by means of a surrounding quartz tube. Thus, it appears that while the embodiment of this patent did produce a more compact and simplified device, it did not solve the problem of scale and contamination buildup which tended to reduce the irradiating efficiency of the device during use.

Other attempts were also made to improve fluid sterilizing units, as disclosed for example in U.S. Pat. No. 3,700,406 to A. Landry, by utilizing fluorinated ethylene propylene plastic, commercially known as Teflon F.E.P., and which has excellent non-stick qualities, is non-contaminating, and will not deteriorate in the presence of ultraviolet light. In this patent it has been proposed to use such material for piping to carry the fluid past a source of ultraviolet light. However, attempts to utilize such material for piping has, in the main, been unsuccessful because of its high imperviousness to ultraviolet rays, when of sufficient thickness to withstand the normally used fluid pressures. For example, considering quartz to have an ultraviolet ray transmission factor of 100%, a sheet or the like of Teflon F.E.P. 0.010 inches thick will reduce U.V. transmission to 25%, although a sheet of Teflon F.E.P. 0.002 inches thick will transmit 75%. It will therefore be apparent that such material could not be used as piping or other means for conveying fluids under the pressures usually employed in connection with fluid purification systems, since it would require a thickness such that ultraviolet transmission would be unduly attenuated.

In its broad aspects, the present invention overcomes the above noted problems and disadvantages of the prior art devices by utilizing a unique combination of a fluid filter unit and fluid sterilizing unit in a single housing with the filter unit surrounding the ultraviolet lamp, and a spaced tube of reflecting or non-reflecting material which cooperate to provide a flow channel for conducting the fluid to be irradiated along the lamp envelope, the outer surface of which is covered with a thin film of fluorinated ethylene propylene. The film is of such thinness as to have a high degree of transmission for the ultraviolet rays, and yet will withstand the fluid pressure in the flow channel because of its intimate engagement with the outer surface of the ultraviolet lamp envelope. With this arrangement scale and contamination around the lamp are substantially reduced, and efficiency of operation maintained over long periods of use.

SUMMARY OF THE INVENTION

The present invention provides a compact fluid purifying device comprising a hollow body supporting an elongate ultraviolet lamp having an extremely thin film of hermetically sealed fluorinated ethylene propylene intimately engaged with the outer surface of the envelope of the lamp to prevent contamination and accumulation of scale or other impurities thereon and yet permit transmission of a relatively large amount of ultraviolet rays therethrough. The lamp assembly is removably mounted within the body and extends through a reflector tube which not only conveys the fluid in a thin walled column over the lamp, but also reflects the ultraviolet rays back and forth through the fluid to increase irradiation thereof.

A tubular filter unit is removably fitted within the body and surrounds the reflector tube in a manner to communicate fluid passing therethrough to one end of the reflector tube, from whence it is conveyed along the length of the lamp to an outlet.

One object of the present invention is to provide in a single housing an improved combined filtering and sterilizing device for water and other fluids.

A further object is to provide a fluid purifying device of the above type which is simple, compact, easy to disassemble and highly effective.

A still further object is to provide an improved fluid purifying device which obviates the need for frequent cleaning of an ultraviolet lamp or other ultraviolet transmission element over which the fluid to be sterilized flows.

Another object is to provide a fluid purifying device in which the ultraviolet lamp is provided with a base support which permits the lamp to be selectively mounted in reversed longitudinally extending positions to meet different installation requirements of the device.

Still another object is to provide an improved and unique ultraviolet lamp unit assembly as an article of manufacture for use in and as a replacement in a fluid purifying device.

Further objects and advantages of the invention will be brought out in the following part of the specification, wherein detailed description is for the purpose of fully disclosing several embodiments of the invention without placing limitations thereon.

BRIEF DESCRIPTION OF THE DRAWINGS

Referring to the accompanying drawings, which are for illustrative purposes only:

FIG. 3 is a sectional elevational view through another embodiment of the invention; and FIG. 4 is an enlarged longitudinal sectional view through an ultraviolet lamp assembly constructed according to the present invention.

DESCRIPTION OF THE EMBODIMENT SHOWN IN FIGS. 1 AND 2

Figure 1:
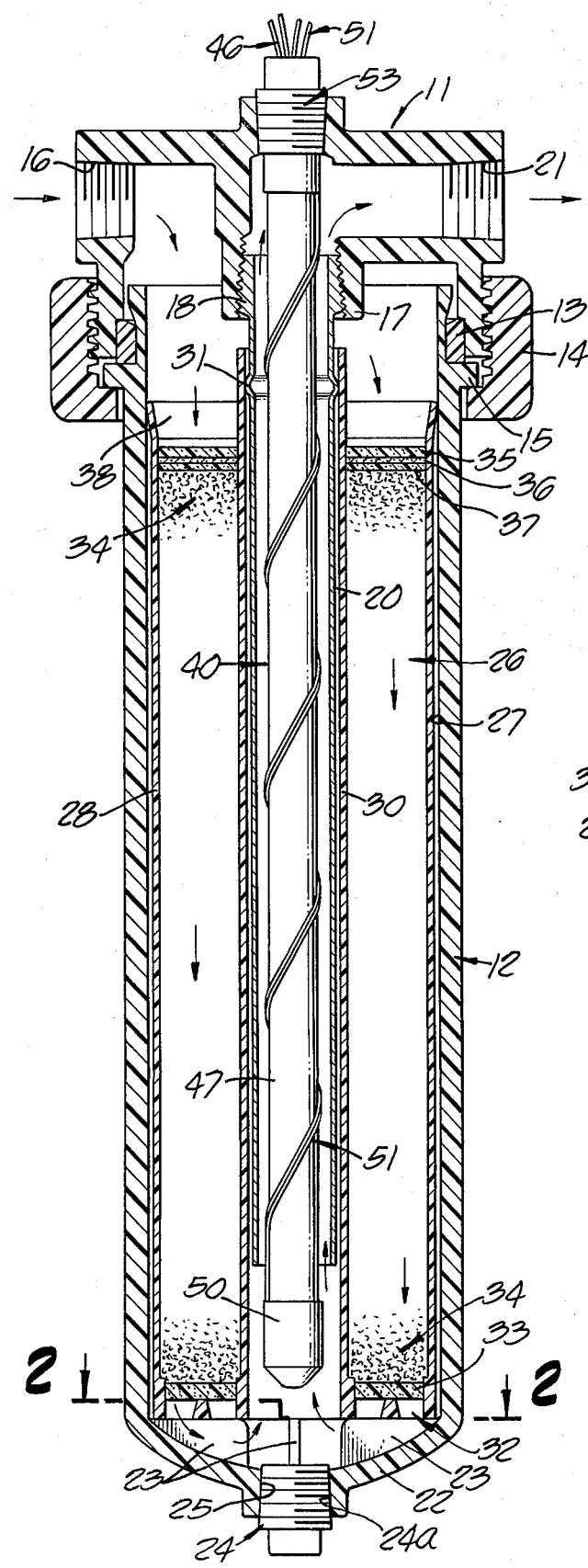
FIG. 1 is a sectional elevational view through one embodiment of the invention.
Figure 2:
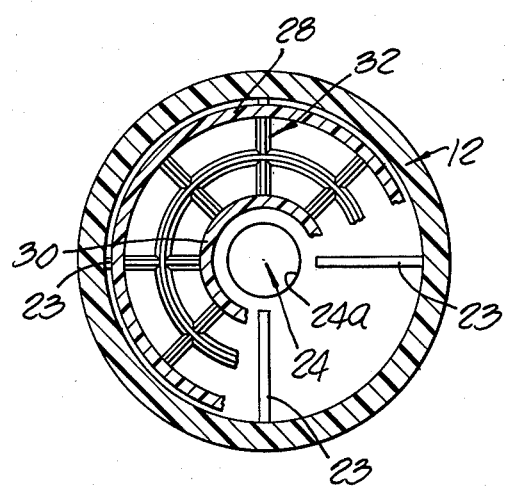
FIG. 2 is a fragmentary transverse sectional view taken substantially along the line 2—2 of FIG. 1.

Referring to FIGS. 1 and 2, the fluid purifying device shown therein comprises a two-part body including an upper housing part 11 and a lower housing part 12, both formed of a suitable plastic, such as polypropylene. An annular sealing ring 13 of elastomeric material is mounted between the housings 11 and 12 to seal the same against fluid pressure. A clamp nut 14 is screw threaded onto the housing part 11 and engages an annular flange 15 on housing part 12 to maintain the housing parts in assembled condition in which they cooperate to provide an interior chamber.

An inlet port 16 is formed in the upper housing 11 for connection to a source of fluid under pressure to be purified. Such inlet port directly communicates with the interior chamber of the body.

A hollow central boss 17 is formed on the upper housing 11 and is suitably connected as by a threaded connector 18 or other suitable means to a tube 20 of appropriate material and preferably of a material such as stainless steel or other highly reflective material with respect to ultraviolet rays. The interior of the tube 20 communicates with an outlet port 21 formed in the upper housing 11, through which the purified fluid is discharged.

A bottom wall 22 of the lower housing 12 is formed to provide a plurality of angularly spaced radially extending filter supporting fins 23 (see also FIG. 2) which surround a tapered drain plug 24 removably secured by screw threads 25 in a drain opening 24a in the bottom wall 22.

A tubular filter cartridge 26 is removably receivable within a bore 27 of the lower housing 12. This cartridge comprises a relatively thin flexible outer cylindrical envelope 28 of plastic or other suitable material and an inner coaxial central tube 30, also of plastic or other suitable material, and which loosely surrounds the reflector tube 20 and independently engages a circumferential bead 31 formed in the tube 20 adjacent its upper end. The envelope 28 and tube 30 are integrally connected at their lowermost ends to a perforated bottom wall structure 32 formed to provide a circular grating as best seen in FIG. 2. The wall 32 rests on the support fins 23 to provide an open communication between the lower end of the cartridge 26 and the interior of the reflector tube 20.

At the bottom of the filter cartridge 26, an annular filter disc 33 of suitable filter material fits within the filter element 28 and rests on the bottom wall 32 to support a filter body 34 of loose granular activated charcoal or other suitable filtering material.

At the top of the filter cartridge 26, a plurality of superimposed annular filter discs 35, 36 and 37 of porous or other suitable material are fitted within the filter envelope 28 to retain the filter material of the body 34. These discs may be formed with progressively finer degrees of porosity.

It should be noted that the upper end of the envelope 28 flares outwardly as indicated at 38 to peripherally engage the surface of the bore 27 of the housing 12. Thus, when a fluid pressure is applied to the upper end of the cartridge 26, the flared portion 38 will yield outwardly to form a seal, preventing the fluid from passing between the cartridge and the bore 27. On the other hand, when no fluid pressure is present, the cartridge 26 may be easily slid along the bore 27 for removal or replacement.

A high intensity ultraviolet lamp 40 (see also FIG. 4) is located in inwardly spaced relation within the reflector tube 20 and extends lengthwise therethrough. The lamp is of conventional construction and comprises an envelope 41 of quartz or other suitable material which is highly transparent to ultraviolet rays. This envelope is suitably bonded to cap elements 42 at its opposite ends. Ignition elements 43 are respectively supported by metal terminal posts 44 which are hermetically sealed within the cap elements 42. The terminal posts 44 at one end of the lamp are electrically connected at 45 to electric supply conductors 46, while the terminal posts 44 at the other end of the lamp are connected at 45 to electric supply conductors 51.

A unique feature of the lamp structure comprises the use of a thin sheath or film 47 of fluorinated ethylene propylene, for example, on the order of 0.002 inches or less in thickness, which is applied over and in intimate contact with the outer surface of the quartz envelope 41 and extends along the length thereof. A plastic base member 48 is molded over said one end portion of the lamp 40 and the flim 47 to hermetically seal the same and the supply conductors 46 and 51 therein.

A cap 50, also of plastic, is molded over said other end of the lamp 40 and the flim 47 to hermetically seal such parts and the connected ends of conductors 51 connected to the terminal posts 44 at this end. The conductors 51 are also covered with fluorinated ethylene propylene and are wrapped in a helical pattern around the film 47 along the length of the lamp 40.

The base member 48 is further provided with tapered screw threads 53 whereby to removably mount the lamp in the upper housing 11 so as to extend within the reflector tube 20 and cooperate therewith to provide an annular fluid flow channel for irradiating fluid received from the upstream filter. Thus, the conductors 46 and 51 extend through the base member 48 for connection to a suitable source of electric current located exteriorly of the body.

From the above, it will be seen that the ultraviolet lamp assembly may be readily removed from the body without disassembling the latter. Further, the plug 24 and lamp base 53 have similar tapered screw threads, and permit such elements to be interchanged so that the lamp assembly may be inserted and screwed into the bottom wall 22 of the housing 12, if so desired.

In operation, the fluid under pressure passes through the inlet port 16 and lengthwise through the filter cartridge 26. As it emerges through the bottom wall 32 of the cartridge, the filtered fluid is directed upwardly through a lower end portion of the cartridge tube 30 and thence through the reflector tube 20 and around the ultraviolet lamp assembly in an annular column where it is thoroughly exposed to ultraviolet irradiation. The conductors 51, due to their helically arranged pattern around the lamp, tend to impart a swirling motion to the fluid passing through the tube 20 to remove any particles which may tend to settle on the flim covering 47. Finally, the sterilized fluid is discharged through the outlet port 21.

DESCRIPTION OF THE EMBODIMENT SHOWN IN FIG. 3

FIG. 3 illustrates an alternative form of the invention in which a different form of filter cartridge, as generally indicated at 55, is provided. The upper housing 11, lower housing 12, reflector tube 20 and ultraviolet lamp assembly 40 are, however, similar to those shown in FIGS. 1, 2 and 4 and are identified by the same reference numerals. In this case, the lamp assembly is illustrated as being mounted in the bottom wall 22 of the housing 12.

The cartridge 55 in this form of the invention comprises a perforated inner tube 56, preferably of plastic, on which is wound a suitable plastic filter filament to form an annular body 57. At the lowermost end of the housing 12, an annular filter retaining member 58 is secured by suitable adhesive or the like to the fins 23 and comprises a sharp upwardly facing annular ridge 60 and an inner tubular extension 61.

At the uppermost end of the housing 12, a second annular filter retaining member 62 having a downwardly facing sharp annular ridge 63 thereon is fitted over the adjacent end of the reflector tube 20 and is maintained in spaced relation with the boss 17 by a tubular spacer 64.

In assembling the filter cartridge 55, the upper housing 11 and attached reflector tube 20 are removed and the filter cartridge 55 inserted into the lower housing 12 over the tubular extension 61. The upper housing 11 is then replaced, and as the clamp nut 14 is actuated to draw the housings 11 and 12 together, the retainer members 58 and 62 embed their respective ridges 60 and 63 into the adjacent ends of the filter cartridge to hold the same in place and to prevent leakage of fluid around the ends of the cartridge.

In operation, fluid under pressure is directed through the inlet port 16, into the chamber surrounding the filter cartridge 55. Fluid then passes radially inwardly through the cartridge, including the perforated tube 56 and is guided downwardly along the outer surface of the tube 20 until it flows around the lower end of the reflector tube 20 and thence upwardly between the ultraviolet lamp assembly and reflector tube to the outlet port 21.

From the foregoing description and drawings, it will be clearly evident that the delineated objects and features of the invention will be accomplished.

Various modifications may suggest themselves to those skilled in the art without departing from the spirit of the invention and, hence, it is not wished to be restricted to the specific forms shown or uses mentioned, except to the extent indicated in the appended claims.

I claim:

1. A fluid purification device comprising a housing defining a chamber therein and having inlet and outlet ports communicating with said chamber;
   a guide tube in said chamber, one end of said guide tube being supported by said housing in fluid flow communication with said outlet port, the other end thereof being in fluid flow communication with said inlet port;
   a tubular filter element in said chamber surrounding said guide tube and in the path of fluid flow from said inlet port to said other end of said guide tube; and
   an elongate ultraviolet lamp unit removably mounted on said housing and extending into said guide tube, spaced inwardly therefrom and defining a flow channel therebetween, said lamp unit including a transparent envelope having a thin continuous solid film of non-stick material surrounding, fixed to and in intimate contact with the outer surface of said envelope, said lamp and film being axially removable from said housing as a unit.

2. A fluid purification device according to claim 1, in which said guide tube is formed of a material capable of reflecting radiation emitted by said ultraviolet lamp.

3. A fluid purification device according to claim 1, in which said filter element is removably mounted in said chamber and wherein said guide tube provides a protective shield for said film during removal and replacement of a filter element.

4. A fluid purification device according to claim 1, including base member for said lamp, said base member hermetically sealing one end of said flim to said envelope.

5. A fluid purification device according to claim 1, including electrical conductors for said lamp, said conductors extending in a helical manner over the outer surface of said film along the length of said lamp to impart a swirling motion to fluid as it passes along said lamp.

6. A fluid purification device according to claim 5, including a cap member for said lamp, said cap member hermetically sealing the opposite end of said film to said envelope.

7. A fluid purification device according to claim 1, including a base member of insulating material supporting said lamp, said base member being screw threaded through said housing whereby said lamp may be removed from said chamber.

8. A fluid purification device according to claim 7, including electric supply conductors for said lamp, said conductors extending through said base member to the exterior of said housing.

9. A fluid purification device comprising a housing defining a chamber therein and having inlet and outlet ports communicating with said chamber;
   a guide tube in said chamber, one end of said guide tube being supported by said housing in fluid flow communication with said outlet port, the other end thereof being in fluid flow communication with said inlet port;
   a tubular filter element in said chamber surrounding said guide tube and in the path of fluid flow from said inlet port to said other end of said guide tube, sealing means at one end of said filter element adjacent said inlet port sealing said one end against fluid flow from said inlet port directly to the said other end of said guide tube;

said housing having threaded mounting means at opposite ends thereof aligned with said guide tube; and an elongate ultraviolet lamp unit having a threaded base member threadedly engaging a selected one of said mounting means and supported thereby to extend into said guide tube whereby said lamp unit may be mounted on said housing to extend into said guide tube from either end thereof.

10. A fluid purifying device according to claim 9, including electric supply conductors for said lamp, said conductors extending through said base member to the exterior of said housing.

11. A fluid purifying device according to claim 9, in which said lamp unit includes a covering of non-stick material extending over said lamp in intimate contact therewith.

12. A fluid purifying device according to claim 9, said sealing means comprising an annular member surrounding said tube supporting one end of said filter element, and a second annular member supported by said housing supporting the opposite end of said filter element.

13. A fluid purifying device according to claim 12, wherein said annular members each have an annular ridge engageable with the associated end of said filter, and means for forcing said annular members toward each other whereby to embed said annular ridges into said filter element.

* * * * *